US012803623B2

(12) United States Patent
Yang et al.

(10) Patent No.: US 12,803,623 B2
(45) Date of Patent: Nov. 17, 2026

(54) METHOD AND DEVICE FOR CODEBOOK DETERMINATION AND SIGNAL PROCESSING, AND READABLE STORAGE MEDIUM

(71) Applicant: DATANG MOBILE COMMUNICATIONS EQUIPMENT CO., LTD., Beijing (CN)

(72) Inventors: Xianjun Yang, Beijing (CN); Xin Su, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 6 days.

(21) Appl. No.: 19/106,189

(22) PCT Filed: Jul. 25, 2023

(86) PCT No.: PCT/CN2023/109124
§ 371 (c)(1),
(2) Date: Feb. 24, 2025

(87) PCT Pub. No.: WO2024/041286
PCT Pub. Date: Feb. 29, 2024

(65) Prior Publication Data

US 2026/0066959 A1 Mar. 5, 2026

(30) Foreign Application Priority Data

Aug. 25, 2022 (CN) ......................... 202211025280.2

(51) Int. Cl.
*H04B 7/0456* (2017.01)
*H04B 7/06* (2006.01)
*H04B 7/08* (2006.01)

(52) U.S. Cl.
CPC ......... *H04B 7/0456* (2013.01); *H04B 7/0617* (2013.01); *H04B 7/086* (2013.01)

(58) Field of Classification Search
CPC .... H04B 7/0456; H04B 7/0617; H04B 7/086; H04B 7/0482; H01Q 3/36
See application file for complete search history.

(56) References Cited

U.S. PATENT DOCUMENTS

2013/0315328 A1 11/2013 Liu
2014/0177683 A1 6/2014 Krishnamurthy et al.
(Continued)

FOREIGN PATENT DOCUMENTS

CN 102624496 A 8/2012
CN 111010738 A 4/2020
CN 113497645 A 10/2021
CN 113630189 A 11/2021

OTHER PUBLICATIONS

Yun Chen, Yifeng Xiong, Da Chen, Tao Jiang, Soon Xin Ng and Lajos Hanzo, Hybrid Precoding for WideBand Millimeter Wave MIMO Systems in the Face of Beam Squint, IEEE Transactions on Wireless Communications, vol. 20, No. 3, Mar. 2021 (Year: 2021).*
(Continued)

*Primary Examiner* — Aristocratis Fotakis
(74) *Attorney, Agent, or Firm* — Ladas & Parry, LLP

(57) ABSTRACT

The present disclosure, which relates to the field of communication technologies, provides a method and a device for codebook determination, a method and a device for signal processing, and a readable storage medium, to improve the effect of suppressing beam squint and reduce the complexity of codebook design. The method includes: dividing a broadband signal into multiple sub-bands; determining a first analog beamforming matrix corresponding to each sub-band; determining a first digital precoding matrix corresponding to each first analog beamforming matrix; and forming a transmission codebook based on each first digital
(Continued)

precoding matrix and a first sub-band-related parameter for each sub-band; where a bandwidth of each sub-band meets following requirement: a difference between a first direction angle and a second direction angle is less than a preset threshold.

17 Claims, 3 Drawing Sheets

(56) References Cited

U.S. PATENT DOCUMENTS

| | | | | |
|---|---|---|---|---|
| 2020/0136691 | A1* | 4/2020 | Li | H04L 27/2644 |
| 2020/0358505 | A1* | 11/2020 | Park | H04B 7/0456 |
| 2022/0038150 | A1* | 2/2022 | Wu | H04B 7/086 |
| 2022/0077998 | A1* | 3/2022 | Raghavan | H04W 72/23 |
| 2023/0026999 | A1 | 1/2023 | Ma | |
| 2023/0155644 | A1 | 5/2023 | Huang et al. | |
| 2025/0055511 | A1* | 2/2025 | El Din | H01Q 19/062 |

OTHER PUBLICATIONS

Qian Wan, Jun Fang, Zhi Chen and Hongbin Li, Hybrid Precoding and Combining for Millimeter Wave/Sub-THz MIMO-OFDM Systems With Beam Squint Effects, IEEE Transactions on Wireless Communications, vol. 70, No. 8, Aug. 2021 (Year: 2021).*

Liza Afeef, Murat Karabacak and Huseyin Arslan, Joint Tracking of Multiple Beams in Beamspace MIMO Systems, Engineering, Computer Science, arXiv: Signal Processing, Nov. 2000 (Year: 2020).*

International Search Report and Written Opinion in International application No. PCT/CN2023/109124, mailed on Sep. 22, 2023.

EPO partial supplementary European search report from corresponding EPO Patent Application No. 23856376.1 dated Aug. 10, 2026.

Ng Chris et al: "Subband Beamforming in Coherent Hybrid Massive MIMO Using Eigenbeams", 2018 52nd Asilomar Conference On Signals, Systems, and Computers IEEE, Oct. 28, 2018, pp. 2126-2129, XP033521244, [retrieved on Feb. 19, 2019], DOI: 10.1109/ACSSC.2018.8645536.

Liza Afeef et al: "Novel Transceiver Design in Wideband Massive MIMO for Beam Squint Minimization", arxiv.org Cornell University Library, 201 Olin Library Cornell University Ithaca, NY 14853, Jul. 11, 2022, XP091268482.

You Li et al: "Beam Squint-Aware Integrated Sensing and Communications for Hybrid Massive MIMO Leo Satellite Systems", IEEE Journal On Selected Areas in Communications IEEE Service Center, Piscataway., US, vol. 40, No. 10, Aug. 7, 2022, pp. 2994-3009, XP011920144, ISSN: 0733-8716, [retrieved on Aug. 8, 2022], DOI: 10.1109/JSAC.2022.3196114, Oct. 2022.

* cited by examiner

METHOD AND DEVICE FOR CODEBOOK DETERMINATION AND SIGNAL PROCESSING, AND READABLE STORAGE MEDIUM

CROSS-REFERENCE TO RELATED APPLICATIONS

This application is the U.S. national phase of PCT Application PCT/CN2023/109124 filed on Jul. 25, 2023, which claims a priority to Chinese Patent Application No. 202211025280.2 filed on Aug. 25, 2022, titled "METHOD AND DEVICE FOR CODEBOOK DETERMINATION AND SIGNAL PROCESSING, AND READABLE STORAGE MEDIUM", the disclosures of which are incorporated in their entireties by reference herein.

TECHNICAL FIELD

The present disclosure relates to the field of communication technologies, and in particular to a method and a device for codebook determination, a method and a device for signal processing, and a readable storage medium.

BACKGROUND

In order to increase data rates, in 6th generation (6th Generation, 6G) communication systems, millimeter-wave frequency bands (30 GHz-300 GHz) and terahertz frequency bands (0.3 THz-10 THz) will be included, and the bandwidth will also be increased from hundreds of MHz to several GHz, or even reaching the level of THz. To compensate for the huge path loss suffered by high-frequency bands such as millimeter-wave frequency bands and terahertz frequency bands, technologies such as the ultra-large-scale antenna technology with ultra-high array gain and the holographic multiple-in multiple-out (Multiple-In Multiple-Out, MIMO) technology become key technologies for communications with high-frequency bands. The hybrid analog-digital beamforming technology is currently the mainstream beamforming technology.

However, in millimeter-wave frequency bands and terahertz frequency bands, the system bandwidth may reach the level of several GHz or THz. In this case, the use of the conventional hybrid analog-digital beamforming in the above may lead to serious beam squint phenomenon. That is, the beam may deviate from the line of sight and spread to other directions like the dispersion of light, and the angle at which the beam deviates from the line of sight changes as the signal frequency changes. Beam squint reduces the power of the signal received by the terminal, thereby lowering the transmission rate of the communication system.

In view of the above issues, a variety of methods for solving beam squint are provided in the related technologies. However, the methods provided in the related technologies either exhibit poor beam squint suppression or are excessively complex.

SUMMARY

The embodiments of the present disclosure provide a method and a device for codebook determination, a method and a device for signal processing, and a readable storage medium, to improve the effect of suppressing beam squint and reduce the complexity of codebook design.

In a first aspect, embodiments of the present disclosure provide a method for codebook determination, applied to a network device, including:

dividing a broadband signal into multiple sub-bands;

determining a first analog beamforming matrix corresponding to each sub-band;

determining a first digital precoding matrix corresponding to each first analog beamforming matrix; and forming a transmission codebook based on each first digital precoding matrix and a first sub-band-related parameter for each sub-band;

where a bandwidth of each sub-band meets following requirement: a difference between a first direction angle and a second direction angle is less than a preset threshold;

where the first direction angle is a direction angle at which a maximum antenna gain is obtained at frequency $f_c+W/2$ or $f_c-W/2$, and the second direction angle is a preset central direction angle;

where $f_c$ represents a center frequency of the broadband signal, and W represents the bandwidth of each sub-band.

Optionally, the determining the first analog beamforming matrix corresponding to each sub-band includes:

determining the first analog beamforming matrix corresponding to each sub-band for a center frequency of the each sub-band, to cause an antenna array gain at the preset central direction angle to be maximized at the center frequency of the each sub-band, or to cause an antenna array gain outside a preset beam width to be minimized for the each sub-band.

Optionally, the method further includes:

performing joint optimization for each first analog beamforming matrix, to obtain a second analog beamforming matrix corresponding to the each first analog beamforming matrix.

Optionally, determining the first digital precoding matrix corresponding to each first analog beamforming matrix or each second analog beamforming matrix includes:

determining a first unitary matrix, where the first unitary matrix makes a product of a third analog beamforming matrix and the first unitary matrix closest to the first analog beamforming matrix or the second analog beamforming matrix under a condition that a transmission power is unchanged; and determining a product of the first unitary matrix and a second digital precoding matrix as the first digital precoding matrix;

where the third analog beamforming matrix is a benchmark analog beamforming matrix corresponding to the broadband signal, and the second digital precoding matrix is a benchmark digital precoding matrix corresponding to each sub-band.

Optionally, the first sub-band-related parameter for each sub-band includes one or more of: the center frequency of the broadband signal, the preset central direction angle, the quantity of sub-bands, or the bandwidth of the each sub-band;

where the forming the transmission codebook based on each first digital precoding matrix and the first sub-band-related parameter for the each sub-band includes: forming the transmission codebook, based on each first sub-band-related parameter, and the first digital precoding matrix corresponding to the first analog beamforming matrix or the second analog beamforming matrix under each first sub-band-related parameter.

Optionally, the method further includes:

determining a reception codebook based on the transmission codebook.

Optionally, the first sub-band-related parameter for each sub-band includes one or more of: the center frequency of the broadband signal, the preset central direction angle, the quantity of sub-bands, or the bandwidth of the each sub-band;

the determining the reception codebook based on the transmission codebook includes: forming the reception codebook, based on each first sub-band-related parameter, and a first reception precoding matrix corresponding to the first analog beamforming matrix or the second analog beamforming matrix under each first sub-band-related parameter.

Optionally, one or more of the first digital precoding matrices corresponding to one or more of the first analog beamforming matrices and/or the second analog beamforming matrices correspond to one of the first reception precoding matrices.

Optionally, the method further includes:

transmitting a first parameter and/or a second parameter to a terminal, where the first parameter indicates a codebook type of the transmission codebook, and the second parameter indicates a codebook type of a reception codebook.

Optionally, the method further includes:

receiving information about a first target digital precoding matrix from a terminal, where the first target digital precoding matrix is a reference digital precoding matrix determined by the terminal for precoding;

determining a second target digital precoding matrix based on the information about the first target digital precoding matrix; and precoding a signal to be processed based on the second target digital precoding matrix, and transmitting the signal to be processed that has been precoded and information about the second target digital precoding matrix to the terminal.

Optionally, the method further includes:

transmitting information about a third target digital precoding matrix to a terminal;

receiving a signal to be processed that has been precoded from the terminal, where the signal to be processed is obtained by precoding based on the third target digital precoding matrix; and demodulating the signal to be processed that has been precoded.

In a second aspect, embodiments of the present disclosure provide a method for signal processing, applied to a terminal, including:

determining information about a target digital precoding matrix; and performing processing based on the information about the target digital precoding matrix;

where the target digital precoding matrix is selected from a target transmission codebook;

where the target transmission codebook is formed by a network device, based on each first sub-band-related parameter, and a first digital precoding matrix corresponding to a first analog beamforming matrix or a second analog beamforming matrix for each sub-band under each first sub-band-related parameter;

where the first sub-band-related parameter for each sub-band includes one or more of: a center frequency of a broadband signal, a preset central direction angle, the quantity of sub-bands, or a bandwidth of each sub-band.

Optionally, the target digital precoding matrix includes a first target digital precoding matrix and a second target digital precoding matrix;

the determining the information about the target digital precoding matrix includes: determining the first target digital precoding matrix, and transmitting information about the first target digital precoding matrix to the network device, where the first target digital precoding matrix is a reference digital precoding matrix determined by the terminal for precoding; and receiving information about the second target digital precoding matrix;

the performing processing based on the information about the target digital precoding matrix includes: receiving a signal to be processed that has been precoded from the network device, and demodulating, based on a reception precoding matrix corresponding to the second target digital precoding matrix, the signal to be processed that has been precoded.

Optionally, the target digital precoding matrix includes a third target digital precoding matrix;

the determining the information about the target digital precoding matrix includes: receiving information about the third target digital precoding matrix from the network device;

the processing based on the information about the target digital precoding matrix includes: precoding, based on the third target digital precoding matrix, a signal to be processed, and transmitting the signal to be processed that has been precoded to the network device.

Optionally, the method further includes:

receiving a first parameter and/or a second parameter, where the first parameter indicates a codebook type of a transmission codebook, and the second parameter indicates a codebook type of a reception codebook.

In a third aspect, embodiments of the present disclosure provide a device for codebook determination, applied to the above network device, including: a memory, a transceiver, and a processor;

the memory is configured to store a computer program, the transceiver is configured to transmit and receive data under control of the processor, and the processor is configured to read the computer program in the memory to perform following operations:

dividing a broadband signal into multiple sub-bands;

determining a first analog beamforming matrix corresponding to each sub-band;

determining a first digital precoding matrix corresponding to each first analog beamforming matrix; and forming a transmission codebook based on each first digital precoding matrix and a first sub-band-related parameter for each sub-band;

a bandwidth of each sub-band meets following requirement: a difference between a first direction angle and a second direction angle is less than a preset threshold;

the first direction angle is a direction angle at which a maximum antenna gain is obtained at frequency $f_c+W/2$ or $f_c-W/2$, and the second direction angle is a preset central direction angle;

$f_c$ represents a center frequency of the broadband signal, and W represents the bandwidth of each sub-band.

Optionally, the processor is further configured to read the computer program in the memory to perform following operation:

determining the first analog beamforming matrix corresponding to each sub-band for a center frequency of the each sub-band, to cause an antenna array gain at the preset central direction angle to be maximized at the center frequency of the each sub-band, or to cause an antenna array gain outside a preset beam width to be minimized for the each sub-band.

Optionally, the processor is further configured to read the computer program in the memory to perform following operation:

performing joint optimization for each first analog beamforming matrix, to obtain a second analog beamforming matrix corresponding to the each first analog beamforming matrix.

Optionally, the processor is further configured to read the computer program in the memory to perform following operation:

determining a first unitary matrix, where the first unitary matrix makes a product of a third analog beamforming matrix and the first unitary matrix closest to the first analog beamforming matrix or the second analog beamforming matrix under a condition that a transmission power is unchanged; and determining a product of the first unitary matrix and a second digital precoding matrix as the first digital precoding matrix;

the third analog beamforming matrix is a benchmark analog beamforming matrix corresponding to the broadband signal, and the second digital precoding matrix is a benchmark digital precoding matrix corresponding to each sub-band.

Optionally, the first sub-band-related parameter for each sub-band includes one or more of: the center frequency of the broadband signal, the preset central direction angle, the quantity of sub-bands, or the bandwidth of the each sub-band;

the processor is further configured to read the computer program in the memory to perform following operation:

forming the transmission codebook, based on each first sub-band-related parameter, and the first digital precoding matrix corresponding to the first analog beamforming matrix or the second analog beamforming matrix under each first sub-band-related parameter.

Optionally, the processor is further configured to read the computer program in the memory to perform following operation:

determining a reception codebook based on the transmission codebook.

Optionally, the first sub-band-related parameter for each sub-band includes one or more of: the center frequency of the broadband signal, the preset central direction angle, the quantity of sub-bands, or the bandwidth of the each sub-band;

the processor is further configured to read the computer program in the memory to perform following operation:

forming the reception codebook, based on each first sub-band-related parameter, and a first reception precoding matrix corresponding to the first analog beamforming matrix or the second analog beamforming matrix under each first sub-band-related parameter.

Optionally, the processor is further configured to read the computer program in the memory to perform following operation:

receiving information about a first target digital precoding matrix from a terminal, where the first target digital precoding matrix is a reference digital precoding matrix determined by the terminal for precoding;

determining a second target digital precoding matrix based on the information about the first target digital precoding matrix; and precoding a signal to be processed based on the second target digital precoding matrix, and transmitting the signal to be processed that has been precoded and information about the second target digital precoding matrix to the terminal.

Optionally, the processor is further configured to read the computer program in the memory to perform following operation:

transmitting information about a third target digital precoding matrix to a terminal;

receiving a signal to be processed that has been precoded from the terminal, where the signal to be processed is obtained by precoding based on the third target digital precoding matrix; and demodulating the signal to be processed that has been precoded.

In a fourth aspect, embodiments of the present disclosure provide a device for signal processing, applied to the above terminal, including: a memory, a transceiver, and a processor;

the memory is configured to store a computer program, the transceiver is configured to transmit and receive data under control of the processor, and the processor is configured to read the computer program in the memory to perform following operations:

determining information about a target digital precoding matrix; and performing processing based on the information about the target digital precoding matrix;

the target digital precoding matrix is selected from a target transmission codebook;

the target transmission codebook is formed by a network device, based on each first sub-band-related parameter, and a first digital precoding matrix corresponding to a first analog beamforming matrix or a second analog beamforming matrix for each sub-band under each first sub-band-related parameter;

the first sub-band-related parameter for each sub-band includes one or more of: a center frequency of a broadband signal, a preset central direction angle, the quantity of sub-bands, or a bandwidth of each sub-band.

Optionally, the target digital precoding matrix includes a first target digital precoding matrix and a second target digital precoding matrix; and the processor is further configured to read the computer program in the memory to perform following operation:

determining the first target digital precoding matrix, and transmitting information about the first target digital precoding matrix to the network device, where the first target digital precoding matrix is a reference digital precoding matrix determined by the terminal for precoding; and receiving information about the second target digital precoding matrix;

the performing processing based on the information about the target digital precoding matrix includes: receiving a signal to be processed that has been precoded from the network device, and demodulating, based on a reception precoding matrix corresponding to the second target digital precoding matrix, the signal to be processed that has been precoded.

Optionally, the target digital precoding matrix includes a third target digital precoding matrix; and the processor is further configured to read the computer program in the memory to perform following operation:

receiving information about the third target digital precoding matrix from the network device;

the processing based on the information about the target digital precoding matrix includes: precoding, based on the third target digital precoding matrix, a signal to be processed, and transmitting the signal to be processed that has been precoded to the network device.

In a fifth aspect, embodiments of the present disclosure provide a device for codebook determination, applied to the above network device, including:

a division unit, configured to divide a broadband signal into multiple sub-bands;

a first determination unit, configured to determine a first analog beamforming matrix corresponding to each sub-band;

a second determination unit, configured to determine a first digital precoding matrix corresponding to each first analog beamforming matrix; and a processing unit, configured to form a transmission codebook based on each first digital precoding matrix and a first sub-band-related parameter for each sub-band;

a bandwidth of each sub-band meets following requirement: a difference between a first direction angle and a second direction angle is less than a preset threshold;

the first direction angle is a direction angle at which a maximum antenna gain is obtained at frequency $f_c+W/2$ or $f_c-W/2$, and the second direction angle is a preset central direction angle;

$f_c$ represents a center frequency of the broadband signal, and W represents the bandwidth of each sub-band.

In a sixth aspect, embodiments of the present disclosure provide a device for signal processing, applied to the above network device, including:

a determination unit, configured to determine information about a target digital precoding matrix; and a processing unit, configured to perform processing based on the information about the target digital precoding matrix;

the target digital precoding matrix is selected from a target transmission codebook;

the target transmission codebook is formed by a network device, based on each first sub-band-related parameter, and a first digital precoding matrix corresponding to a first analog beamforming matrix or a second analog beamforming matrix for each sub-band under each first sub-band-related parameter;

the first sub-band-related parameter for each sub-band includes one or more of: a center frequency of a broadband signal, a preset central direction angle, the quantity of sub-bands, or a bandwidth of each sub-band.

In a seventh aspect, embodiments of the present disclosure further provide a processor readable storage medium, on which a computer program is stored. When the computer program is executed by a processor, the steps in the method described above are performed.

In the embodiments of the present disclosure, in the process of determining the transmission codebook, a dispersion angle of each sub-band is limited by limiting the bandwidth of the each sub-band, thereby effectively suppressing beam squint.

DETAILED DESCRIPTION

The term "and/or" in the embodiments of the present disclosure describes an association relationship of associated objects, which indicates that there may be three types of relationships. For example, A and/or B may represent three situations: only A being included, both A and B being included, only B being included. The character "/" generally indicates that there is an "or" relationship between associated objects in front of it and behind it.

The term "multiple" in the embodiments of the present disclosure refers to two or more than two, and other words for expressing quantities are similar to it.

The technical solutions in embodiments of the present disclosure are described clearly and completely in conjunction with drawings in the embodiments of the present disclosure. Apparently, the described embodiments are merely a part of rather than all the embodiments of the present disclosure. All other embodiments obtained by a person ordinary skilled in the art based on the embodiments of the present disclosure without any creative efforts fall within the protection scope of the present disclosure.

The embodiments of the present disclosure provide a method and a device for codebook determination, a method and a device for signal processing, and a readable storage medium, to improve the effect of suppressing beam squint and reduce the complexity of codebook design.

The method and the device are based on the same application concept. Since the principles of solving problems in the method and the device are similar, reference may be made to each other for implementations of the device and the method, the repetition of which is not further provided herein.

Figure 1:
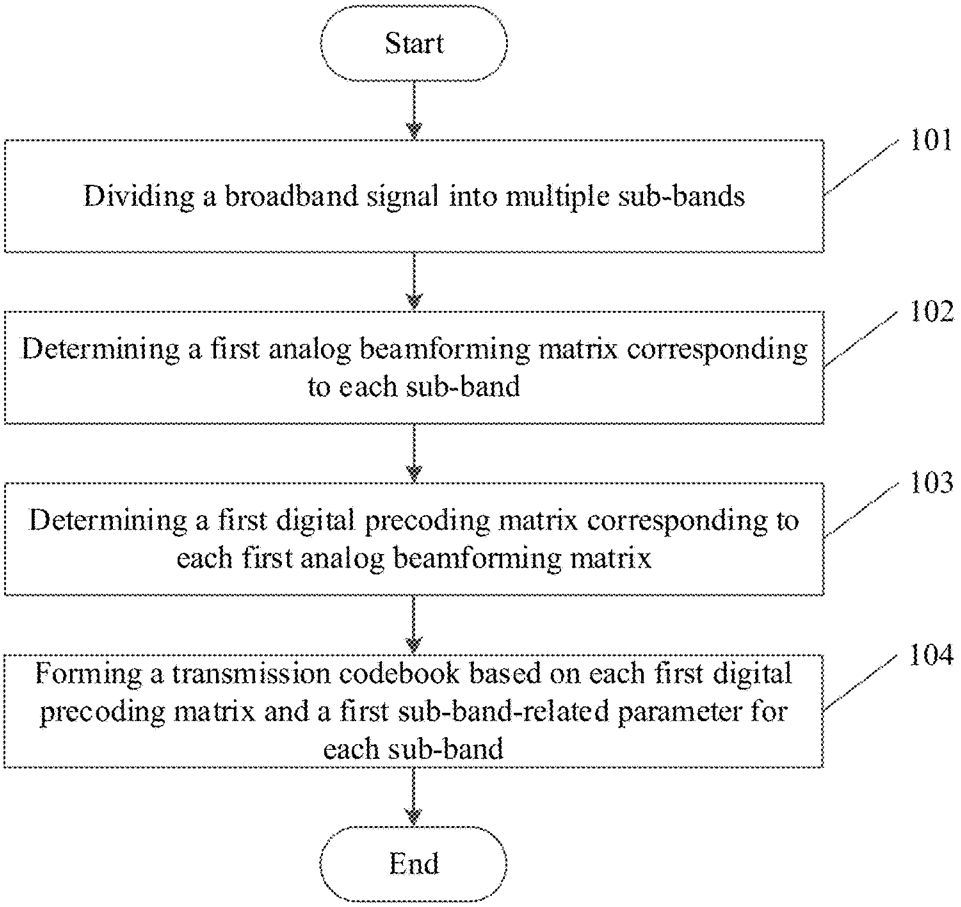
FIG. 1 is a flow chart of a method for codebook determination according to embodiments of the present disclosure.

Reference is made to FIG. 1, and FIG. 1 is a flow chart of a method for codebook determination provided by embodiments of the present disclosure, which may be applied to a network device. As shown in FIG. 1, the method includes the following steps.

Step 101: dividing a broadband signal into multiple sub-bands.

It is assumed that a center frequency of the broadband signal is $f_c$, its bandwidth is B, its bandwidth range is $(f_c-B/2, f_c+B/2)$, the network device (such as a base station) has $N_T$ transmission antennas, there are $N_{RF}$ radio frequency chains, and the quantity of flows is $N_s$; a terminal has $N_R$ reception antennas. $F_{RF}$ is a benchmark analog beamforming matrix with a dimension of $N_T \times N_{RF}$; $F_{BB}$ is a benchmark digital precoding matrix with a dimension of $N_{RF} \times N_s$; a symbol vector to be sent is s with a dimension of $N_s \times 1$; an expression of a signal x sent by the network device is: $x=F_{RF}F_{BB}s$, where the dimension of x is $N_T \times 1$, and s is the symbol vector to be sent.

In this step, the network device evenly divides the broadband signal with the bandwidth of B into M (M is an integer greater than or equal to 2) sub-bands, where a bandwidth of each sub-band is W=[B/M]. It is assumed that a center frequency of sub-band m is $f_m$, where the value of m is m=1, . . . . M or m=0, 1, . . . , M−1.

The bandwidth of each sub-band meets the following requirement:

a difference $\theta_d$ between a first direction angle $\theta_w$ and a second direction angle $\theta_0$ is less than a preset threshold $\theta_T$, which may be expressed as:

$$\theta_d = |\theta_w - \theta_0| < \theta_T$$

the first direction angle is a direction angle at which a maximum antenna gain is obtained at frequency $f_c$+W/2 or $f_c$−W/2, and the second direction angle is a preset central direction angle. The preset threshold may be set as required.

Step 102: determining a first analog beamforming matrix corresponding to each sub-band.

In this step, the first analog beamforming matrix corresponding to each sub-band is determined for a center frequency of the each sub-band, to cause an antenna array gain at the preset central direction angle $\theta_0$ (i.e., the second direction angle) to be maximized at the center frequency of the each sub-band, or to cause an antenna array gain outside a preset beam width to be minimized for the each sub-band. The preset beam width may be set as required.

Sub-band m is taken as an example. For the center frequency $f_m$ of sub-band m, an equivalent analog beamforming matrix, i.e., the first analog beamforming matrix $w_m$, may be determined, to cause the antenna array gain at the preset central direction angle $\theta_0$ to be maximized at the center frequency $f_m$, or to cause the antenna array gain outside the preset beam width to be minimized for the sub-band m.

Optionally, based on the obtained first analog beamforming matrices, joint optimization may be performed on them, to obtain a second analog beamforming matrix corresponding to each first analog beamforming matrix. The purpose of performing the joint optimization is to reduce inter-sub-band interference and maximize throughput on the entire bandwidth B.

Specifically, the base station expresses the obtained M first analog beamforming matrices into a diagonal matrix form:

$$W = \begin{bmatrix} w_1 & & & \\ & w_2 & & \\ \dots & \dots & & \\ & & & w_m \end{bmatrix}$$

$w_1, w_2 \dots w_m$ are the first analog beamforming matrices corresponding to sub-band 1, sub-band 2 . . . sub-band m respectively. It is assumed that the second analog beamforming matrix corresponding to each sub-band is obtained after the joint optimization. It is assumed that the second analog beamforming matrix corresponding to sub-band m is expressed as $\xi_m$.

Step 103: determining a first digital precoding matrix corresponding to each first analog beamforming matrix.

In a case that the second analog beamforming matrices are obtained in step 102, the first digital precoding matrices corresponding to the second analog beamforming matrices may be determined. The principle of determining the first digital precoding matrices corresponding to the first analog beamforming matrices is the same as the principle of determining the first digital precoding matrices corresponding to the second analog beamforming matrices.

Specifically, in this step, first, for each first analog beamforming matrix, a first unitary matrix is determined, where the first unitary matrix makes a product of a third analog beamforming matrix and the first unitary matrix closest to the first analog beamforming matrix or the second analog beamforming matrix under a condition that a transmission power is unchanged. The third analog beamforming matrix is a benchmark analog beamforming matrix $F_{RF}$ corresponding to the broadband signal, which is designed by using a conventional hybrid analog-digital beamforming algorithm and is implemented by a phase shifter in hardware. The third analog beamforming matrix may be obtained in other ways, and the specific way of obtaining it is not limited in the embodiments of the present disclosure.

It is assumed that the phase shifter remains unchanged, its generated analog beamforming matrix is $F_{RF}$, which is for the entire bandwidth and can be used as the benchmark analog beamforming matrix herein. In order to achieve the first analog beamforming matrix $w_m$ of the sub-band, it is needed to multiply the third analog beamforming matrix $F_{RF}$ by the first unitary matrix $$F_c^m$$

on the right for compensation. The design principle of $$F_c^m$$

is to make $$F_{RF}F_c^m$$

closest to $w_m$ and ensure that the transmission power remains unchanged. Specifically, $$F_c^m$$

needs to meet the following condition:

$$\min_{F_c^m} \|F_{RF}F_c^m - w_m\|_F$$

$$\text{s.t. } (F_c^m)^H F_c^m = I$$

$\|\bullet\|_F$ represents the F norm of the matrix. The above optimization problem is a typical Procrustes orthogonal problem, and its optimal solution is the closed-form solution in the following:

$$F_c^m = VU^H$$

U and V are unitary matrices obtained by performing singular value decomposition on the matrix $$w_m^H F_{RF},$$

that is, $$w_m^H F_{RF} = U\Sigma V^H,$$

where $$w_m^H$$

is the conjugate matrix of $w_m$.

In a case that the joint optimization is performed in step 102, similarly, to achieve the second analog beamforming matrix $\xi_m$ of the sub-band, the design principle of $$F_c^m$$

is to make $$F_{RF} F_c^m$$

closest to $\xi_m$ and ensure that the transmission power remains unchanged.

$$F_c^m$$

needs to meet the following condition.

$$\min_{F_c^m} \|F_{RF} F_c^m - w_m\|_F$$
$$\text{s.t. } (F_c^m)^H F_c^m = I$$

In this case, U and V of $$F_c^m = VU^H$$

in the optimal solution are unitary matrices obtained by performing singular value decomposition on matrix $$\xi_m^H F_{RF},$$

that is, $$\xi_m^H F_{RF} = U\Sigma V^H . \xi_m^H$$

is the conjugate matrix of $\xi_m$.

After the first unitary matrix is determined, in this step, a product of the first unitary matrix and a second digital precoding matrix is determined as the first digital precoding matrix. The second digital precoding matrix is a benchmark digital precoding matrix corresponding to each sub-band.

Specifically, although $$F_c^m$$

is designed to approximate the first analog beamforming matrix of the sub-band, its implementation is performed in the digital domain, which is equivalent to multiplying the second digital precoding matrix $$F_m^{BB}$$

(the benchmark digital precoding matrix corresponding to sub-band m) by $$F_c^m$$

on the left. The design of the benchmark digital precoding matrix $$F_m^{BB}$$

may still be carried out according to the current design rule, that is, the first digital precoding matrix (or referred to as the equivalent digital precoding matrix)

$$G_m^{BB}$$

corresponding to sub-band m may be expressed as:

$$G_m^{BB} = F_c^m F_m^{BB}$$

In this case, the expression of the transmission signal $x_m$ on sub-band m is:

$$x_m = F_{RF} G_m^{BB} s_m = F_{RF} F_c^m F_m^{BB} s_m$$

$s_m$ is the symbol vector to be sent on sub-band m, and its dimension is $N_s \times 1$.

Through the above processing, the beam squint caused by analog beamforming can be compensated based on the sub-bands by using the equivalent digital precoding matrix.

Step 104: forming a transmission codebook based on each first digital precoding matrix and a first sub-band-related parameter for each sub-band.

In an embodiments of the present disclosure, the first sub-band-related parameter for each sub-band includes one or more of: the center frequency of the broadband signal, the preset central direction angle, the quantity of sub-bands, or the bandwidth of the each sub-band, etc.

In this step, the transmission codebook is formed, based on each first sub-band-related parameter, and the first digital precoding matrix corresponding to the first analog beamforming matrix or the second analog beamforming matrix under each first sub-band-related parameter. It should be noted that the parameters used to form the transmission codebook in the embodiments are not limited to the parameters mentioned in the embodiments, and may include other parameters.

That is, the transmission codebook $J_w$ may include multiple codebooks, and each codebook includes one or more of the following:

one value of the preset central direction angle $\theta_0$;
one value of the quantity M of the sub-bands;
one value of the bandwidth W of the sub-band;
M first digital precoding matrices $$G_m^{BB}$$

corresponding to the first equivalent analog beamforming matrices $w_m$, which correspond to the above values of $\theta_0$, M and W.

Or, each codebook of the transmitted codebook $J_\xi$ includes one or more of the following:

one value of the preset central direction angle $\theta_0$;
one value of the quantity M of the sub-bands;
one value of the bandwidth W of the sub-band;
M first digital precoding matrices $$G_m^{BB}$$

corresponding to the second equivalent analog beamforming matrices $\xi_m$, which correspond to the above values of $\theta_0$, M and W.

It can be seen from the above description that in the embodiments of the present disclosure, in the process of determining the transmission codebook, a dispersion angle of each sub-band is limited by limiting the bandwidth of the each sub-band, thereby effectively suppressing beam squint. Moreover, in the above solving process, the problem to be solved has a closed-form solution, and optimization processing is not required, thereby reducing the complexity.

Optionally, based on the above process, the method of the embodiments of the present disclosure may further include the following step:

determining a reception codebook based on the transmission codebook. The reception codebook is determined, based on each first sub-band-related parameter, and a first reception precoding matrix corresponding to the first analog beamforming matrix or the second analog beamforming matrix under each first sub-band-related parameter. In the embodiments of the present disclosure, the specific method for obtaining the first reception precoding matrix is not limited, and the first reception precoding matrix can be obtained in a method specified by an existing protocol. It should be noted that the parameters used to form the reception codebook in the embodiments are not limited to the parameters mentioned in the embodiment, and may include other parameters.

That is, the reception codebook $R_w$ may include multiple codebooks, and each codebook includes one or more of the following:

one value of the preset central direction angle $\theta_0$;
one value of the quantity M of the sub-bands;
one value of the bandwidth W of the sub-band;
N (N is an integer, N≤M) first reception precoding matrices $V_n$ corresponding to the first analog beamforming matrices $w_m$, which correspond to the above values of $\theta_0$, M and W.

That is, the reception codebook $R_\xi$ may include multiple codebooks, and each codebook includes one or more of the following:

one value of the preset central direction angle $\theta_0$;
one value of the quantity M of the sub-bands;
one value of the bandwidth W of the sub-band;
N (N is an integer, N≤M) first reception precoding matrices $\xi_n$ corresponding to the second analog beamforming matrices $\xi_m$, which correspond to the above values of $\theta_0$, M and W.

One or more of the first digital precoding matrices corresponding to one or more of the first analog beamforming matrices and/or the second analog beamforming matrices correspond to one of the first reception precoding matrices.

For example, one or more first digital precoding matrices $$G_m^{BB}$$

corresponding to one or more first analog beamforming matrices $w_m$ correspond to one first reception precoding matrix $V_n$; or, one or more first digital precoding matrices $$G_m^{BB}$$

corresponding to one or more second analog beamforming matrices $\xi_m$ correspond to one first reception precoding matrix $\xi_n$.

In practical applications, the transmission codebook and/or reception codebook described in the above may be set to have a new codebook type. For example, for the transmission codebook, the network device may set the high-layer parameter, codebook type (codebookType), to 'type III' and/or 'type III advanced' in NR. The codebook type may be notified to the terminal in a predefined manner, or the network device may transmit a first parameter and/or a second parameter to the terminal, where the first parameter indicates a codebook type of the transmission codebook, and the second parameter indicates the codebook type of the reception codebook. For example, the network device may notify the first parameter and/or the second parameter by way of radio resource control (RRC) configuration.

Optionally, the transmission codebook and/or the reception codebook may be broadcasted to the terminal by the network device at one time, or may be directly written into the terminal when leaving the factory, that is, the codebook may be written into the terminal in a predefined manner. Correspondingly, the terminal stores the reception codebook and the transmission codebook described in the above.

In addition, in order to reduce the overhead of codebook feedback, i.e., to reduce the size of the codebook, in actual applications, the network device may only notify the terminal of the quantity M of the sub-bands.

Since the signal bandwidth B is known to both the network device and the terminal, the terminal can obtain the bandwidth W of each sub-band by calculating. The terminal can obtain the preset beam angle $\theta_0$ through beam searching. The terminal may obtaining the first analog beamforming matrix and/or the second analog beamforming matrix by calculating in the same manner as the network device, and thus obtain the first digital precoding matrix and the reception precoding matrix. In this way, the terminal can obtain the transmission codebook or the reception codebook.

Optionally, based on the above embodiments, the network device may perform signal transmission based on the transmission codebook (downlink transmission codebook).

For example, in the downlink direction, the network device may receive information about a first target digital precoding matrix from the terminal, where the first target digital precoding matrix is a reference digital precoding matrix determined by the terminal for precoding; and determine a second target digital precoding matrix based on the information about the first target digital precoding matrix. Then, a signal to be processed is precoded based on the second target digital precoding matrix, and the signal to be processed that has been precoded and information about the second target digital precoding matrix are transmitted to the terminal.

Specifically, a case where the network device is a base station is taken as an example, and the following process may be included:

(1) The base station configures the terminal with an appropriate codebook type based on the bandwidth of the signal to be sent and the requirements for channel feedback accuracy, etc.

(2) The base station sends a downlink reference signal for downlink channel estimation.

(3) The terminal receives the downlink reference signal sent by the base station.

(4) The terminal estimates the downlink channel based on the received downlink reference signal.

(5) The terminal selects an appropriate or an appropriate set of precoding matrix (i.e., first target digital precoding matrix) from the stored corresponding codebook type based on the estimated channel and the configured codebook type, and reports the index of the selected first target digital precoding matrix.

(6) The index of the first target digital precoding matrix fed back by the terminal is received by the base station.

(7) The base station further determines a corresponding second target digital precoding matrix based on the received index of the first target digital precoding matrix and the scheduling requirement.

(8) If the codebook type configured by the base station for the terminal is the codebook type designed above, the base station performs precoding based on the preset central direction angle of the beam, the frequency of the signal (for example, through subcarrier index), and the division of the sub-bands in the second target digital precoding matrix, where the expression of the signal $x_m$ of the m-th sub-band is $$x_m = F_{RF} G_m^{BB} s_m = F_{RF} F_c^m F_m^{BB} s_m.$$

(9) The base station sends the precoded signal and the index of the second target digital precoding matrix to the terminal.

(10) The terminal receives the precoded signal and the index of the second target digital precoding matrix sent by the base station.

(11) The terminal determines a corresponding digital precoding matrix based on the information about the second target digital precoding matrix, and demodulates the precoded signal that is received.

In the uplink direction, the terminal may perform signal transmission based on the transmission codebook (uplink transmission codebook).

The network device may transmit information about a third target digital precoding matrix to a terminal; and receive a signal to be processed that has been precoded from the terminal, where the signal to be processed is obtained by precoding based on the third target digital precoding matrix. Then, the signal to be processed that has been precoded is demodulated.

Specifically, a case where the network device is a base station is taken as an example, and the following process may be included:

(1) The base station configures the terminal with an appropriate codebook type based on the bandwidth of the signal to be sent and the requirements for channel feedback accuracy, etc.

(2) The terminal sends an uplink reference signal for uplink channel estimation.

(3) The base station receives an uplink reference signal.

(4) The base station estimates the uplink channel based on the received uplink reference signal.

(5) The base station selects an appropriate or an appropriate set of precoding matrix (i.e., third target digital precoding matrix) from the stored corresponding codebook type based on the estimated channel and the configured codebook type, and sends the index of the selected third target precoding matrix to the terminal.

(6) The terminal receives the index of the third target digital precoding matrix fed back by the base station.

(7) The terminal performs precoding based on the received index of the third target digital precoding matrix, the frequency of the signal (for example, through the subcarrier index), and the division of the sub-bands in the third target digital precoding matrix.

(8) The terminal sends the precoded signal to the base station.

(9) The base station receives the precoded signal sent by the terminal and demodulates the received precoded signal. The precoding matrix used by the base station to demodulate the signal depends on the specific implementation of the base station.

In the embodiments of the present disclosure, the transmission codebook or the reception codebook may include uplink and downlink transmission codebooks or uplink and downlink reception codebooks.

The uplink transmission codebook and the downlink transmission codebook are determined based on the same principle, and the uplink reception codebook and the downlink reception codebook are designed based on the same principle.

When the duplex mode is time division duplex (Time Division Duplex, TDD), the uplink bandwidth is equal to the downlink bandwidth, so the division method for the uplink sub-bands is the same as the division method for the downlink sub-bands; the difference is that the quantity of transmission antennas of the terminal in uplink transmission is less than the quantity of transmission antennas of the base station in downlink transmission. When the duplex mode is frequency division duplex (Frequency Division Duplex, FDD), in general, the uplink bandwidth is typically smaller than the downlink bandwidth.

Figure 2:
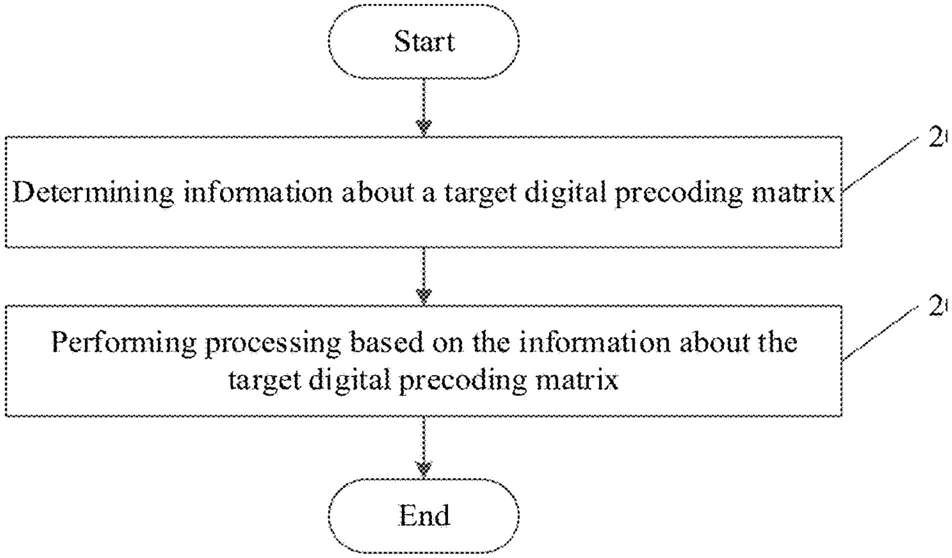
FIG. 2 is a flow chart of a method for signal processing according to embodiments of the present disclosure.

Reference is made to FIG. 2, and FIG. 2 is a flow chart of a method for signal processing provided by embodiments of the present disclosure, which may be applied to a terminal. As shown in FIG. 2, the method includes the following steps.

Step 201: determining information about a target digital precoding matrix.

In the downlink direction, the target digital precoding matrix includes a first target digital precoding matrix and a second target digital precoding matrix. Specifically, in this step, the terminal determines the first target digital precoding matrix, and transmits information about the first target digital precoding matrix to the network device, where the first target digital precoding matrix is a reference digital precoding matrix determined by the terminal for precoding; and receives information about the second target digital precoding matrix. For the manner in which the terminal determines the first target digital precoding matrix, reference may be made to the description of the above method embodiments.

In the uplink direction, the target digital precoding matrix includes a third target digital precoding matrix. Specifically, in this step, the terminal receives information about the third target digital precoding matrix from the network device. That is, the terminal determines the third target digital precoding matrix as the target digital precoding matrix.

Step 202: performing processing based on the information about the target digital precoding matrix.

The target digital precoding matrix is selected from a target transmission codebook. The target transmission codebook is formed by a network device, based on each first sub-band-related parameter, and a first digital precoding matrix corresponding to a first analog beamforming matrix or a second analog beamforming matrix for each sub-band under each first sub-band-related parameter.

The first sub-band-related parameter for each sub-band includes one or more of:

a center frequency of a broadband signal, a preset central direction angle, the quantity of sub-bands, or a bandwidth of each sub-band, etc.

The bandwidth of each sub-band meets the requirements as described in the above embodiments. It should be noted that the parameters used to form the target transmission codebook in the embodiments are not limited to the parameters mentioned in the embodiments, and may include other parameters.

Specifically, in this step, in the downlink direction, the terminal receives a signal to be processed that has been precoded from the network device, and demodulates, based on a reception precoding matrix corresponding to the second target digital precoding matrix, the signal to be processed that has been precoded.

In the uplink direction, the terminal precodes, based on the third target digital precoding matrix, a signal to be processed, and transmits the signal to be processed that has been precoded to the network device.

It can be seen from the above description that in the embodiments of the present disclosure, in the process of determining the transmission codebook, a dispersion angle of each sub-band is limited by limiting the bandwidth of the each sub-band, thereby effectively suppressing beam squint. Therefore, using the above codebook to perform signal processing also improves the efficiency of signal processing.

In the embodiments of the present disclosure, when determining the codebook, the signal with a large bandwidth is decomposed into multiple sub-bands, the equivalent analog beamforming matrix (first analog beamforming matrix) is designed for each sub-band, and then the corresponding digital precoding matrix (first digital precoding matrix) is designed based on the designed equivalent analog beamforming matrix, so that the codebook is formed based on the first digital precoding matrix and the sub-band-related parameter for each sub-band. Through the above process, the beam squint caused by analog beamforming can be compensated based on the sub-bands, effectively reducing the performance loss caused by the beam squint, which has low computational complexity and does not increase hardware cost and power consumption. In addition, based on the above, joint optimization may be performed for the codebook to reduce interference between the sub-bands.

The detailed implementation process of the present disclosure is described hereinafter in combination with different embodiments.

In an embodiment of the present disclosure, the following case is taken as an example for description: both a downlink transmission codebook and a downlink reception codebook need to be designed, and joint optimization is not further performed for the digital precoding matrix. A case where the network device is a base station is taken as an example.

It is assumed that a center frequency of the downlink broadband signal is $f_c$, its bandwidth is B, its bandwidth range is $(f_c-B/2, f_c+B/2)$, the base station has $N_T$ transmission antennas, the terminal has $N_R$ reception antennas, an antenna signal to be sent by the base station is x with a dimension of $N_T\times 1$.

This embodiment mainly includes the following process.

(1) Codebook design, including:

1. The base station evenly divides the broadband signal with the bandwidth of B into M sub-bands, where a bandwidth of each sub-band is W=[B/M]. It is assumed that a center frequency of sub-band m is $f_m$. That is, the value range of $f_m$ is $[f_c-(M-1)W/2, f_c-(M-3)W/2, \ldots, f_c-W/2, f_c, f_c+W/2, \ldots, f_c+(M-3)W/2, f_c+(M-1)W/2]$, where the value of m is m=1, . . . M.

The bandwidth W of each sub-band is set as follows: an angle difference $\theta_d$ between a direction angle $\theta_w$ (i.e., the first direction angle) at which a maximum antenna gain is obtained at frequency $f_c+W/2$ or $f_c-W/2$ and a preset central direction angle $\theta_0$ (i.e., the second direction angle) satisfies the following relationship:

$$\theta_d = |\theta_w - \theta_0| < \theta_T$$

$\theta_T$ is a preset threshold.

2. The base station determines the first analog beamforming matrix $w_m$ for the center frequency $f_m$ of the each sub-band m, to cause an antenna array gain at the preset central direction angle $\theta_0$ to be maximized at the frequency $f_m$.
3. The base station determines a corresponding digital precoding matrix (i.e., a first digital precoding matrix) based on the first analog beamforming matrix $w_m$.

It is assumed that the phase shifter remains unchanged, its generated analog beamforming matrix is $F_{RF}$, which is for the entire bandwidth. In order to achieve the first analog beamforming matrix $w_m$ of the sub-band, it is needed to multiply the third analog beamforming matrix $F_{RF}$ by the first unitary matrix $$F_c^m$$

on the right for compensation. The design principle of $$F_c^m$$

is to make $$F_{RF}F_c^m$$

closest to $w_m$ and ensure that the transmission power remains unchanged. Specifically, $$F_c^m$$

needs to meet the following condition:

$$\min_{F_c^m} \|F_{RF}F_c^m - w_m\|_F$$

$$\text{s.t. } (F_c^m)^H F_c^m = 1$$

$\|\bullet\|_F$ represents the F norm of the matrix. The above optimization problem is a typical Procrustes orthogonal problem, and its optimal solution is the closed-form solution in the following:

$$F_c^m = VU^H$$

U and V are unitary matrices obtained by performing singular value decomposition on the matrix $$w_m^H F_{RF},$$

that is, $$w_m^H F_{RF} = U \sum V^H,$$

where $$w_m^H$$

is the conjugate matrix of $w_m$. Although $$F_c^m$$

is designed to approximate the first analog beamforming matrix of the sub-band, its implementation is performed in the digital domain, which is equivalent to multiplying the second digital precoding matrix $$F_m^{BB}$$

(the benchmark digital precoding matrix corresponding to sub-band m) by $$F_c^m$$

on the left. The design of the benchmark digital precoding matrix $$F_m^{BB}$$

may still be carried out according to the current design rule. That is, the first digital precoding matrix $$G_m^{BB}$$

corresponding to sub-band m may be expressed as:

$$G_m^{BB} = F_c^m F_m^{BB}.$$

In this case, the expression of the transmission signal $x_m$ on sub-band m is:

$$x_m = F_{RF} G_m^{BB} s_m = F_{RF} F_c^m F_m^{BB} s_m$$

$s_m$ is the symbol vector to be sent on sub-band m, and its dimension is $N_s \times 1$.

4. The base station forms the downlink transmission codebook:

All values of $\theta_0$, M and W, and the first digital precoding matrices $$G_m^{BB}$$

corresponding to the first analog beamforming matrices $w_m$ under different values of $\theta_0$, M and W form the transmission codebook $J_w$ of the base station.

It is assumed that there are J sets of codebooks in the downlink transmission codebook $J_w$, and each set of codebook includes:

one value of the preset central direction angle $\theta_0$; one value of the quantity M of the sub-bands; one value of the bandwidth W of the sub-band; M equivalent digital precoding matrices corresponding to the equivalent analog beamforming matrices $w_m$, which correspond to the above values of $\theta_0$, M and W.

5. The base station determines the downlink reception codebook based on the downlink transmission codebook.

The reception codebook includes all values of $\theta_0$, M and W, and first reception precoding matrices $V_n$ corresponding to the first analog beamforming matrices $w_m$ under different values of $\theta_0$, M and W.

The reception codebook $R_w$ may include J sets of codebooks, and each codebook includes one or more of the following:

one value of the preset central direction angle $\theta_0$;

one value of the quantity M of the sub-bands;

one value of the bandwidth W of the sub-band;

N (N is an integer, N<M) first reception precoding matrices $V_n$ corresponding to the first analog beamforming matrices $w_m$, which correspond to the above values of $\theta_0$, M and W. That is, multiple first analog beamforming matrices $w_m$ correspond to one first reception precoding matrix $V_n$.

6. The base station sets the transmission codebook designed above to a new codebook type, such as setting the high-layer parameter codebookType to 'type III' in NR. The downlink transmission codebook and the downlink reception codebook may both be predefined.

(2) The base station performs signal processing based on the downlink transmission codebook, specifically including:

1. The base station configures the terminal with a codebook type 'type III' based on the bandwidth of the signal to be sent and the requirements for channel feedback accuracy, etc.
2. The base station sends a downlink reference signal for downlink channel estimation.
3. The terminal receives the downlink reference signal sent by the base station.
4. The terminal estimates the downlink channel based on the received downlink reference signal.
5. The terminal selects an appropriate set of precoding matrix (i.e., first target digital precoding matrix) from the stored codebook type 'type III' based on the estimated channel and the configured codebook type, and reports the index of the first target digital precoding matrix.
6. The index of the first target digital precoding matrix fed back by the terminal is received by the base station.
7. The base station further determines a corresponding precoding matrix (second target digital precoding matrix) based on the received index of the first target digital precoding matrix and the scheduling requirement.
8. The base station precodes the signal x based on the frequency of the signal x (for example, through sub-carrier index), and the division of the sub-bands in the second target digital precoding matrix, where the expression of the signal $x_m$ of the m-th sub-band is $$x_m = F_{RF} G_m^{BB} s_m = F_{RF} F_c^m F_m^{BB} s_m.$$

9. The base station sends the precoded signal to the terminal, and informs the terminal of the index of the second target digital precoding matrix.
10. The terminal receives the signal and the index of the second target digital precoding matrix sent by the base station.
11. The terminal determines the second target digital precoding matrix based on the index of the second target digital precoding matrix, and demodulates the signal received from the base station.

In the embodiments of the present disclosure, a case where only a downlink transmission codebook needs to be designed and joint optimization is further performed is taken as an example.

It is assumed that a center frequency of the downlink broadband signal is $f_c$, its bandwidth is B, its bandwidth range is $(f_c-B/2, f_c+B/2)$, the base station has $N_T$ transmission antennas, the terminal has $N_R$ reception antennas, an antenna signal to be sent by the base station is x with a dimension of $N_T \times 1$.

This embodiment mainly includes the following process.

(1) Codebook design, including:

1. The base station evenly divides the broadband signal with the bandwidth of B into M sub-bands, where a bandwidth of each sub-band is W=[B/M]. It is assumed that a center frequency of sub-band m is $f_m$. That is, the value range of $f_m$ is $[f_c-(M-1)W/2, f_c-(M-3)W/2, \ldots, f_c-W/2, f_c, f_c+W/2, \ldots, f_c+(M-3)W/2, f_c+(M-1)W/2]$, where the value of m is m=1, . . . . M.

The bandwidth W of each sub-band is set as follows: an angle difference between a direction angle $\theta_w$ (i.e., the first direction angle) at which a maximum antenna gain is obtained at frequency $f_c+W/2$ and a preset central direction angle $\theta_0$ (i.e., the second direction angle) satisfies the following relationship:

$$\theta_d = |\theta_w - \theta_0| < \theta_T$$

$\theta_T$ is a preset threshold.

2. The base station determines the first analog beamforming matrix $w_m$ for the center frequency $f_m$ of the each sub-band m, to cause an antenna array gain at the preset central direction angle $\theta_0$ to be maximized at the frequency $f_m$.
3. The base station expresses the obtained M first analog beamforming matrices into a diagonal matrix form:

$$W = \begin{bmatrix} w_1 & & & \\ & w_2 & & \\ \cdots & \cdots & & \\ & & & w_m \end{bmatrix}$$

$w_1, w_2 \ldots w_m$ are the first analog beamforming matrices corresponding to sub-band 1, sub-band 2 . . . sub-band m respectively. The above diagonal matrix is jointly optimized to reduce the interference between the sub-bands and maximize the throughput on the entire bandwidth B. It is assumed that the second analog beamforming matrix corresponding to each sub-band is obtained after the joint optimization. It is assumed that the second analog beamforming matrix corresponding to sub-band m is expressed as $\xi_m$.

4. The base station determines a corresponding digital precoding matrix (i.e., the first digital precoding matrix) based on the second analog beamforming matrix $\xi_m$.

It is assumed that the phase shifter remains unchanged, its generated analog beamforming matrix is $F_{RF}$, which is for the entire bandwidth. In order to achieve the second analog beamforming matrix $\xi_m$ of the sub-band, it is needed to multiply the third analog beamforming matrix $F_{RF}$ by the first unitary matrix $$F_c^m$$

on the right for compensation. The design principle of $$F_c^m$$

is to make $$F_{RF}F_c^m$$

closest to $\xi_m$ and ensure that the transmission power remains unchanged.

$$F_c^m$$

needs to meet the following condition:

$$\min_{F_c^m} \|F_{RF}F_c^m - \xi_m\|_F$$

$$\text{s.t. } (F_c^m)^H F_c^m = I$$

In this case, U and V of $$F_c^m = VU^H$$

in the optimal solution are unitary matrices obtained by performing singular value decomposition on matrix $$\xi_m^H F_{RF},$$

that is, $$\xi_m^H F_{RF} = U \sum V^H \cdot \xi_m^H$$

is the conjugate matrix of $\xi_m$.

Although $$F_c^m$$

is designed to approximate the first analog beamforming matrix of the sub-band, its implementation is performed in the digital domain, which is equivalent to multiplying the second digital precoding matrix $$F_m^{BB}$$

(the benchmark digital precoding matrix corresponding to sub-band m) by $$F_c^m$$

on the left. The design of the benchmark digital precoding matrix $$F_m^{BB}$$

may still be carried out according to the current design rule, that is, the first digital precoding matrix $$G_m^{BB}$$

corresponding to sub-band m may be expressed as:

$$G_m^{BB} = F_c^m F_m^{BB}.$$

In this case, the expression of the transmission signal $x_m$ on sub-band m is:

$$x_m = F_{RF}G_m^{BB}s_m = F_{RF}F_c^m F_m^{BB}s_m$$

$s_m$ is the symbol vector to be sent on sub-band m, and its dimension is $N_s \times 1$.

5. The base station forms the downlink transmission codebook:

All values of $\theta_0$, M and W, and the first digital precoding matrices $$G_m^{BB}$$

corresponding to the second analog beamforming matrices $\xi_m$ under different values of $\theta_0$, M and W form the transmission codebook JE of the base station.

It is assumed that there are J sets of codebooks in the downlink transmission codebook $J_\xi$, and each set of codebook includes:

one value of the preset central direction angle $\theta_0$; one value of the quantity M of the sub-bands; one value of the bandwidth W of the sub-band; M equivalent digital precoding matrices $$G_m^{BB}$$

corresponding to the second analog beamforming matrices $\xi_m$, which correspond to the above values of $\theta_0$, M and W.

6. The base station sets the transmission codebook designed above to a new codebook type, such as setting the high-layer parameter codebookType to 'type III advanced I' in NR. The downlink transmission codebook may be predefined.

(2) The base station performs signal processing based on the downlink transmission codebook, specifically including:

1. The base station configures the terminal with a codebook type 'type III advanced I' based on the bandwidth of the signal to be sent and the requirements for channel feedback accuracy, etc.
2. The base station sends a downlink reference signal for downlink channel estimation.
3. The terminal receives the downlink reference signal sent by the base station.
4. The terminal estimates the downlink channel based on the received downlink reference signal.
5. The terminal selects an appropriate set of precoding matrix (i.e., first target digital precoding matrix) from the stored codebook type 'type III advanced I' based on the estimated channel and the configured codebook type, and reports the index of the first target digital precoding matrix.
6. The index of the first target digital precoding matrix fed back by the terminal is received by the base station.
7. The base station further determines a corresponding precoding matrix (second target digital precoding matrix) based on the received index of the first target digital precoding matrix and the scheduling requirement.
8. If the codebook type configured by the base station for the terminal is the above codebook type, the base station precodes the signal x based on the frequency of the signal x (for example, through subcarrier index), and the division of the sub-bands in the second target digital precoding matrix, where the expression of the signal $x_m$ of the m-th sub-band is $$x_m = F_{RF} G_m^{BB} s_m = F_{RF} F_c^m F_m^{BB} s_m.$$

9. The base station sends the precoded signal to the terminal, and informs the terminal of the index of the second target digital precoding matrix.
10. The terminal receives the signal and the index of the second target digital precoding matrix sent by the base station.
11. The terminal determines the second target digital precoding matrix based on the index of the second target digital precoding matrix, and demodulates the signal received from the base station.

In an embodiment of the present disclosure, a case where an uplink transmission codebook needs to be designed for FDD and the digital precoding matrix does not require further joint optimization is taken as an example. A case where the network device is a base station is taken as an example.

It is assumed that a center frequency of the uplink broadband signal is $f_c$, its bandwidth is $B_2$, its bandwidth range is $(f_c-B_2/2, f_c+B_2/2)$, the terminal has $M_T$ transmission antennas, the base station has $M_R$ reception antennas, an antenna signal to be sent by the terminal is x with a dimension of $M_T\times1$. The design of the codebook is still performed by the base station, and the designed codebook will be notified to the terminal in the form of factory settings or the like. This embodiment mainly includes the following processes.

(1) Codebook design, including:

1. The base station evenly divides the broadband signal with the bandwidth of $B_2$ into $M_2$ sub-bands, where a bandwidth of each sub-band is $W_2=[B_2/M_2]$. It is assumed that a center frequency of sub-band m is $e_m$. That is, the value range of $e_m$ is $[e_c-(M_2-1)W_2/2, e_c-(M_2-3)W_2/2, \ldots, e_c-M_2/2, e_c, e_c+W_2/2, \ldots, e_c+(M_2-3)W_2/2, e_c+(M_2-1)W_2/2]$, where the value of m is $m=1, \ldots M_2$.

In order to distinguish from the parameters forming the downlink transmission codebook mentioned above, different symbols are used to represent the first direction angle, the second direction angle (the preset central direction angle), the difference between the first direction angle and the second direction angle, and the preset threshold.

The bandwidth $W_2$ of each sub-band is set as follows: an angle difference $\vartheta_d$ between a direction angle $\vartheta_w$ (i.e., the first direction angle) at which a maximum antenna gain is obtained at frequency $e_c+W_2/2$ and a preset central direction angle $\vartheta_0$ (i.e., the second direction angle) satisfies the following relationship:

$$\vartheta_d = |\vartheta_w - \vartheta_0| < \vartheta_T$$

$\vartheta_T$ is a preset threshold.

2. The base station determines the first analog beamforming matrix $\overline{w}_m$ for the center frequency $e_m$ of the each sub-band m, to cause an antenna array gain at the preset central direction angle $\vartheta_0$ to be maximized at the frequency $e_m$.
3. The base station determines a corresponding digital precoding matrix (i.e., a first digital precoding matrix) based on the first analog beamforming matrix $\overline{w}_m$.

It is assumed that the phase shifter remains unchanged, its generated analog beamforming matrix (benchmark analog beamforming matrix) is $E_{RF}$, which is for the entire bandwidth. In order to achieve the first analog beamforming matrix $\overline{w}_m$ of the sub-band, it is needed to multiply the third analog beamforming matrix $E_{RF}$ by the first unitary matrix $$E_c^m$$

on the right for compensation. The design principle of $$E_c^m$$

is to make $$E_{RF}E_c^m$$

closest to $\overline{w}_m$ and ensure that the transmission power remains unchanged. Specifically, $$E_c^m$$

needs to meet the following condition:

$$\min_{E_c^m} \|E_{RF}E_c^m - \overline{w}_m\|_F$$
$$\text{s.t. } (E_c^m)^H E_c^m = I$$

$\|\bullet\|_F$ represents the F norm of the matrix. The above optimization problem is a typical Procrustes orthogonal problem, and its optimal solution is the closed-form solution in the following:

$$E_c^m = VU^H$$

U and V are unitary matrices obtained by performing singular value decomposition on the matrix $$\overline{w}_m^H E_{RF},$$

that is, $$\overline{w}_m^H E_{RF} = U\Sigma V^H,$$

where $$\overline{w}_m^H$$

is the conjugate matrix of $\overline{w}_m$.

Although $$E_c^m$$

is designed to approximate the first analog beamforming matrix of the sub-band, its implementation is performed in the digital domain, which is equivalent to multiplying the second digital precoding matrix $$E_m^{BB}$$

(the benchmark digital precoding matrix corresponding to sub-band m) by $$E_c^m$$

on the left. The design of the benchmark digital precoding matrix $$E_m^{BB}$$

may still be carried out according to the current design rule. That is, the first digital precoding matris $$D_m^{BB}$$

corresponding to sub-band m may be expressed as:

$$D_m^{BB} = E_c^m E_m^{BB}.$$

In this case, the expression of the transmission signal $x_m$ on sub-band m is:

$$x_m = E_{RF} D_m^{BB} t_m = E_{RF} E_c^m E_m^{BB} t_m$$

$t_m$ is the symbol vector to be sent on sub-band m, and its dimension is $M_s \times 1$.

4. The base station forms the downlink transmission codebook:

All values of $\vartheta_0$, $M_2$ and $W_2$, and the first digital precoding matrices $$D_m^{BB}$$

Corresponding to the first analog beamforming matrices $\overline{w}_m$ under different values of $\vartheta_0$, $M_2$ and $W_2$ form the transmission codebook $J_{\overline{w}}$ of the base station.

It is assumed that there are K sets of codebooks in the downlink transmission codebook $J_{\overline{w}}$, and each set of codebook includes:

one value of the preset central direction angle $\vartheta_0$; one value of the quantity $M_2$ of the sub-bands; one value of the bandwidth $W_2$ of the sub-band; $M_2$ equivalent digital precoding matrices corresponding to the equivalent analog beamforming matrices $\overline{w}_m$, which correspond to the above values of $\vartheta_0$, $M_2$ and $W_2$.

5. The base station sets the transmission codebook designed above to a new codebook type, such as setting the high-layer parameter codebook Type to 'type III' in NR.

6. The base station notifies the terminal of the uplink transmission codebook in a predefined manner.

(2) The base station performs signal processing based on the downlink transmission codebook, specifically including:

1. The base station configures the terminal with the codebook type 'type III' based on the bandwidth of the signal to be sent and the requirements for channel feedback accuracy, etc.
2. The terminal sends an uplink reference signal for uplink channel estimation.
3. The base station receives the uplink reference signal sent by the terminal.
4. The base station estimates the uplink channel based on the received uplink reference signal.
5. The base station selects an appropriate set of digital precoding matrix (third target digital precoding matrix) from the stored codebook type 'type III' based on the estimated channel and the configured codebook type, and reports the index of third target digital precoding matrix.
6. The terminal receives the index of the third target digital precoding matrix fed back by the base station.
7. The terminal precodes the signal x based on the index of the received third target digital precoding matrix, the frequency of the signal x (for example, through sub-carrier index), and the division of the sub-bands in the third target digital precoding matrix, where the expression of the signal $x_m$ of the m-th sup-band is $$x_m = E_{RF} D_m^{BB} t_m = E_{RF} E_c^m E_m^{BB} t_m.$$

8. The terminal sends the precoded signal to the base station.
9. The base station receives and demodulates the signal sent by the terminal. The decoding precoding matrix used by the base station to demodulate the signal is determined by the base station itself based on implementation.

It can be seen from the above description that in the embodiments of the present disclosure, the band is divided into multiple sub-bands to reduce the performance loss caused by beam squint with lower computational complexity; by performing joint optimization, the interference between sub-bands can be reduced without changing the corresponding hardware structure, and the hardware cost and power consumption will not be increased.

It should be noted that, in the embodiments of the present disclosure, the parameters used to form the transmission codebook and/or the reception codebook are not limited to the parameters mentioned in the embodiments of the present disclosure, and may include other parameters.

The technical solutions in the embodiments of the present disclosure may be applied to various systems, especially 5th Generation (5G) communication system. For example, the applicable system may be a global system of mobile communication (Global System of Mobile Communication, GSM) system, a code division multiple access (Code Division Multiple Access, CDMA) system, a wideband code division multiple access (Wideband Code Division Multiple Access, WCDMA) system, a general packet radio service (general packet radio service, GPRS) system, a long term evolution (Long Term Evolution, LTE) system, an LTE frequency division duplex (frequency division duplex, FDD) system, an LTE time division duplex (time division duplex, TDD) system, a long term evolution advanced (long term evolution advanced, LTE-A) system, a universal mobile telecommunication system (universal mobile telecommunication system, UMTS), a worldwide interoperability for microwave access (worldwide interoperability for microwave access, WiMAX) system, a 5G new radio (New Radio, NR) system, etc. These systems each include a terminal and a network device. The system may also include a core network part, such as an evolved packet system (Evolved Packet System, EPS), a 5G system (5GS), etc.

The terminal involved in the embodiments of the present disclosure may refers to a device that provides voice and/or data connectivity to a user, a handheld device with a wireless connection function, or other processing devices connected to a wireless modem. In different systems, the name of the terminal may be different. For example, in 5G systems, the terminal may be referred to as a user equipment (User Equipment, UE). A wireless terminal may communicate with one or more core networks (Core Network, CN) through a radio access network (Radio Access Network, RAN). The wireless terminal may be a mobile terminal, such as a mobile phone (or referred to as a "cellular" phone) or a computer with a mobile terminal, for example, it may be a portable, pocket type, handheld, computer built-in, or vehicle mounted mobile device, which exchanges languages and/or data with a radio access network. For example, it may be a personal communication service (Personal Communication Service, PCS) phone, a cordless phone, a session initiated protocol (Session Initiated Protocol, SIP) phone, a wireless local loop (Wireless Local Loop, WLL) station, a personal digital assistant (Personal Digital Assistant, PDA), or other devices. Or the wireless terminal may be referred to as a system, a subscriber unit (subscriber unit), a subscriber station (subscriber station), a mobile station (mobile station), a mobile (mobile), a remote station (remote station), an access point (access point), a remote terminal (remote terminal), an access terminal (access terminal), a user terminal (user terminal), a user agent (user agent), or a user device (user device), which is not limited in the embodiments of the present disclosure.

The network device involved in the embodiments of the present disclosure may be a base station, and the base station may have multiple cells providing services for terminals. According to different application scenarios, the base station may also be referred to as an access point, or may be a device in an access network that communicates with wireless terminals through one or more sectors on air interfaces, or may have other names. The network device may be configured to exchange received air frames and Internet protocol (Internet Protocol, IP) packets, serving as a router between the wireless terminals and rest of the access network, where the rest of the access network may include an Internet Protocol (IP) communication network. The network device may also coordinate attribute management of air interfaces. For example, the network device involved in the embodiments of the present disclosure may be a network device (Base Transceiver Station, BTS) in a global system for mobile communications (Global System for Mobile Communications, GSM) or a code division multiple access (Code Division Multiple Access, CDMA), or may be a network device (NodeB) in wide-band code division multiple access (Wide-band Code Division Multiple Access, WCDMA), or may be an evolutional network device (evolutional Node B, eNB or e-NodeB) in a long term evolution (Long Term Evolution, LTE) system or a 5G base station (gNB) in a 5G network architecture (next generation system), or may be a home evolved node B (Home evolved Node B, HeNB), a relay node (relay node), a femto (femto), a pico (pico), etc., which is not limited in the embodiments of the present disclosure. In some network structures, the network device may include a centralized unit (centralized unit, CU) node and a distributed unit (distributed unit, DU) node, and the centralized unit and the distributed unit may be geographically separated.

The network device and the terminal may each use one or more antennas to perform multi input multi output (Multi Input Multi Output, MIMO) transmission, where the MIMO transmission may be single user MIMO (Single User MIMO, SU-MIMO) or multiple user MIMO (Multiple User MIMO, MU-MIMO). According to the form and the quantity of the antenna combination, the MIMO transmission may be 2-dimensional MIMO (2D-MIMO), 3-dimensional MIMO (3D-MIMO), full dimension MIMO (FD-MIMO), or massive MIMO (massive-MIMO), or may be diversity transmission, or precoding transmission, or beamforming transmission, etc.

Figure 3:
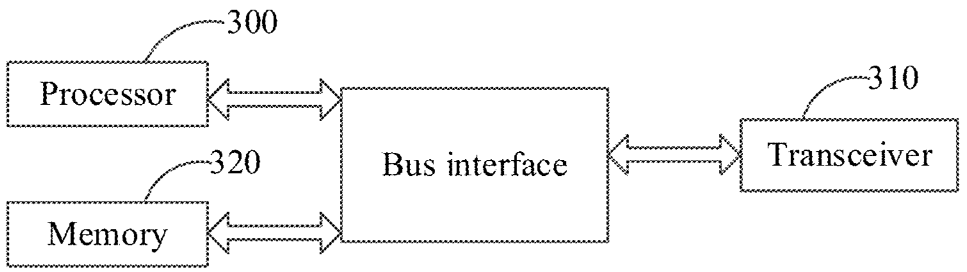
FIG. 3 is a structural diagram of a device for codebook determination according to embodiments of the present disclosure.

As shown in FIG. 3, a device for codebook determination according to embodiments of the present disclosure is applied to a network device, and includes: a processor 300 configured to read a program in a memory 320 to perform the following process:

dividing a broadband signal into multiple sub-bands;

determining a first analog beamforming matrix corresponding to each sub-band;

determining a first digital precoding matrix corresponding to each first analog beamforming matrix; and forming a transmission codebook based on each first digital precoding matrix and a first sub-band-related parameter for each sub-band;

a bandwidth of each sub-band meets following requirement: a difference between a first direction angle and a second direction angle is less than a preset threshold;

the first direction angle is a direction angle at which a maximum antenna gain is obtained at frequency $f_c$+W/2 or $f_c$−W/2, and the second direction angle is a preset central direction angle;

$f_c$ represents a center frequency of the broadband signal, and W represents the bandwidth of each sub-band.

The transceiver 310 is configured to receive and send data under control of the processor 300.

In FIG. 3, a bus architecture may include any quantity of interconnected buses and bridges. Various circuits including one or more processors represented by the processor 300 and a memory represented by the memory 320 are linked. The bus architecture may further link various other circuits together, such as a periphery component, a voltage stabilizer and a power management circuit, which are known in the art and are not further described herein. A bus interface provides an interface. The transceiver 310 may be multiple elements, i.e., including a transmitter and a receiver, providing a unit for communicating with various other devices on transmission media. The processor 300 is in charge of managing the bus architecture and common processes. The memory 320 may store data used by the processor 300 in performing operations.

The processor 300 may be a Central Processing Unit (Central Processing Unit, CPU), an Application Specific Integrated Circuit (Application Specific Integrated Circuit, ASIC), a Field-Programmable Gate Array (Field-Programmable Gate Array, FPGA), or a Complex Programmable Logic Device (Complex Programmable Logic Device, CPLD), or the processor may adopt a multi-core architecture.

The processor 300 is in charge of managing the bus architecture and common processes. The memory 320 may store data used by the processor 300 in performing operations.

The processor 300 is further configured to read the program to perform the following step:

determining the first analog beamforming matrix corresponding to each sub-band for a center frequency of the each sub-band, to cause an antenna array gain at the preset central direction angle to be maximized at the center frequency of the each sub-band, or to cause an antenna array gain outside a preset beam width to be minimized for the each sub-band.

The processor 300 is further configured to read the program to perform the following steps:

performing joint optimization for each first analog beamforming matrix, to obtain a second analog beamforming matrix corresponding to the each first analog beamforming matrix.

The processor 300 is further configured to read the program to perform the following steps:

determining a first unitary matrix, where the first unitary matrix makes a product of a third analog beamforming matrix and the first unitary matrix closest to the first analog beamforming matrix or the second analog beamforming matrix under a condition that a transmission power is unchanged; and determining a product of the first unitary matrix and a second digital precoding matrix as the first digital precoding matrix;

where the third analog beamforming matrix is a benchmark analog beamforming matrix corresponding to the broadband signal, and the second digital precoding matrix is a benchmark digital precoding matrix corresponding to each sub-band.

The first sub-band-related parameter for each sub-band includes one or more of: the center frequency of the broadband signal, the preset central direction angle, the quantity of sub-bands, or the bandwidth of the each sub-band; the processor 300 is also used to read the program to perform the following steps:

forming the transmission codebook based on each first digital precoding matrix and the first sub-band-related parameter for the each sub-band, including:

forming the transmission codebook, based on each first sub-band-related parameter, and the first digital precoding matrix corresponding to the first analog beamforming matrix or the second analog beamforming matrix under each first sub-band-related parameter.

The first sub-band-related parameter for each sub-band includes one or more of: the center frequency of the broadband signal, the preset central direction angle, the quantity of sub-bands, or the bandwidth of the each sub-band. The processor 300 is also configured to read the program to perform the following steps:

determining a reception codebook based on the transmission codebook;

forming the reception codebook, based on each first sub-band-related parameter, and a first reception precoding matrix corresponding to the first analog beamforming matrix or the second analog beamforming matrix under each first sub-band-related parameter.

One or more of the first digital precoding matrices corresponding to one or more of the first analog beamforming matrices and/or the second analog beamforming matrices correspond to one of the first reception precoding matrices.

The processor 300 is further configured to read the program to perform the following step:

transmitting a first parameter and/or a second parameter to a terminal, where the first parameter indicates a codebook type of the transmission codebook, and the second parameter indicates a codebook type of a reception codebook.

The processor 300 is further configured to read the program to perform the following steps:

receiving information about a first target digital precoding matrix from a terminal, where the first target digital precoding matrix is a reference digital precoding matrix determined by the terminal for precoding;

determining a second target digital precoding matrix based on the information about the first target digital precoding matrix; and precoding a signal to be processed based on the second target digital precoding matrix, and transmitting the signal to be processed that has been preceded and information about the second target digital precoding matrix to the terminal.

The processor 300 is further configured to read the program to perform the following steps:

transmitting information about a third target digital precoding matrix to a terminal;

receiving a signal to be processed that has been precoded from the terminal, where the signal to be processed is obtained by precoding based on the third target digital precoding matrix; and demodulating the signal to be processed that has been precoded.

It should be noted that the device according to the embodiments of the present disclosure can implement all the method steps implemented by the network device in the above method embodiments, and the same technical effects can be realized. The same parts of the present embodiments as the method embodiments, and the beneficial effects, are not further provided herein.

Figure 4:
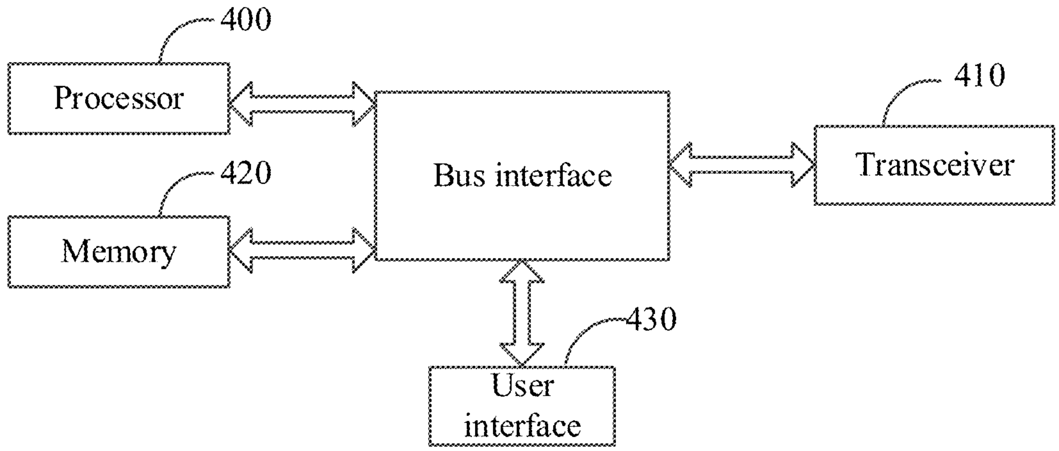
FIG. 4 is a structural diagram of a device for signal processing according to embodiments of the present disclosure.

As shown in FIG. 4, A device for signal processing of the embodiments of the present disclosure is applied to a terminal, and includes: a processor 400, which is configured to read the program in a memory 420 to perform the following process:

the target digital precoding matrix includes a first target digital precoding matrix and a second target digital precoding matrix; a transceiver 410 is configured to receive and send data under control of the processor 400.

In FIG. 4, a bus architecture may include any quantity of interconnected buses and bridges. Various circuits including one or more processors represented by the processor 400 and a memory represented by the memory 420 are linked. The bus architecture may further link various other circuits together, such as a periphery component, a voltage stabilizer and a power management circuit, which are known in the art and are not further described herein. A bus interface provides an interface. The transceiver 410 may be multiple elements, i.e., including a transmitter and a receiver, providing a unit for communicating with various other devices on transmission media. The transmission media include a wireless channel, a wired channel, an optical cable, or other transmission media. For different user equipments, the user interface 430 may be an interface capable of connecting externally and internally with the required equipment. The connected equipment includes but not limited to a keypad, a display, a speaker, a microphone, a joystick, etc.

The processor 400 is in charge of managing the bus architecture and common processes. The memory 420 may store data used by the processor 400 in performing operations.

Optionally, the processor 400 may be a central processing unit (Central Processing Device, CPU), an application specific integrated circuit (Application Specific Integrated Circuit, ASIC), a field programmable gate array (Field Programmable Gate Array, FPGA), or a complex programmable logic device (Complex Programmable Logic Device, CPLD), or the processor may adopt a multi-core architecture.

The processor is configured to execute any of the methods in the embodiments of the present application according to obtained executable instructions by calling the computer program stored in the memory. The processor and the memory may be physically arranged separately.

The target digital precoding matrix includes a first target digital precoding matrix and a second target digital precoding matrix; the processor 400 is further configured to read the program to perform the following steps:

determining the first target digital precoding matrix, and transmitting information about the first target digital precoding matrix to the network device, where the first target digital precoding matrix is a reference digital precoding matrix determined by the terminal for precoding; and receiving information about the second target digital precoding matrix;

receiving a signal to be processed that has been precoded from the network device, and demodulating, based on a reception precoding matrix corresponding to the second target digital precoding matrix, the signal to be processed that has been precoded.

The target digital precoding matrix includes a third target digital precoding matrix; the processor 400 is further configured to read the program to perform the following steps:

receiving information about the third target digital precoding matrix from the network device;

precoding, based on the third target digital precoding matrix, a signal to be processed, and transmitting the signal to be processed that has been precoded to the network device.

The processor 400 is further configured to read the program to perform the following steps:

receiving a first parameter and/or a second parameter, where the first parameter indicates a codebook type of a transmission codebook, and the second parameter indicates a codebook type of a reception codebook.

It should be noted that the device according to the embodiments of the present disclosure can implement all the method steps implemented by the terminal in the above method embodiments, and the same technical effects can be realized. The same parts of the present embodiments as the method embodiments, and the beneficial effects, are not further provided herein.

Figure 5:
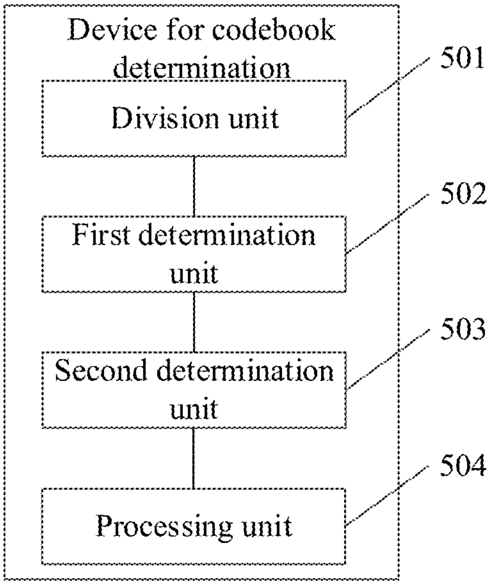
FIG. 5 is a second structural diagram of a device for codebook determination according to embodiments of the present disclosure.

As shown in FIG. 5, a device for codebook determination of the embodiments of the present disclosure is applied to a network device, including:

a division unit 501, configured to divide a broadband signal into multiple sub-bands; a first determination unit 502, configured to determine a first analog beamforming matrix corresponding to each sub-band; a second determination unit 503, configured to determine a first digital precoding matrix corresponding to each first analog beamforming matrix; and a processing unit 504, configured to form a transmission codebook based on each first digital precoding matrix and a first sub-band-related parameter for each sub-band;

a bandwidth of each sub-band meets following requirement: a difference between a first direction angle and a second direction angle is less than a preset threshold;

the first direction angle is a direction angle at which a maximum antenna gain is obtained at frequency $f_c$+W/2 or $f_c$−W/2, and the second direction angle is a preset central direction angle;

$f_c$ represents a center frequency of the broadband signal, and W represents the bandwidth of each sub-band.

Optionally, the first determination unit 502 is configured to determine the first analog beamforming matrix corresponding to each sub-band for a center frequency of the each sub-band, to cause an antenna array gain at the preset central direction angle to be maximized at the center frequency of the each sub-band, or to cause an antenna array gain outside a preset beam width to be minimized for the each sub-band.

Optionally, the device further includes:

a first obtaining unit, configured to perform joint optimization for each first analog beamforming matrix, to obtain a second analog beamforming matrix corresponding to the each first analog beamforming matrix.

Optionally, the second determination unit 503 includes:

a determination submodule, configured to determine a first unitary matrix, where the first unitary matrix makes a product of a third analog beamforming matrix and the first unitary matrix closest to the first analog beamforming matrix or the second analog beamforming matrix under a condition that a transmission power is unchanged; and an obtaining submodule, configured to determine a product of the first unitary matrix and a second digital precoding matrix as the first digital precoding matrix;

the third analog beamforming matrix is a benchmark analog beamforming matrix corresponding to the broadband signal, and the second digital precoding matrix is a benchmark digital precoding matrix corresponding to each sub-band.

Optionally, the first sub-band-related parameter for each sub-band includes one or more of: the center frequency of the broadband signal, the preset central direction angle, the quantity of sub-bands, or the bandwidth of the each sub-band, etc.; the processing unit 504 is configured to form the transmission codebook, based on each first sub-band-related parameter, and the first digital precoding matrix corresponding to the first analog beamforming matrix or the second analog beamforming matrix under each first sub-band-related parameter.

Optionally, the device may further include:

a third determination unit, configured to determine a reception codebook based on the transmission codebook.

Optionally, the third determination unit is configured to form the reception codebook, based on each first sub-band-related parameter, and a first reception precoding matrix corresponding to the first analog beamforming matrix or the second analog beamforming matrix under each first sub-band-related parameter.

One or more of the first digital precoding matrices corresponding to one or more of the first analog beamforming matrices and/or the second analog beamforming matrices correspond to one of the first reception precoding matrices.

Optionally, the device may further include:

a first transmission unit, configured to transmit a first parameter and/or a second parameter to a terminal, where the first parameter indicates a codebook type of the transmission codebook, and the second parameter indicates a codebook type of a reception codebook.

Optionally, the device may further include:

a first reception end unit, configured to receive information about a first target digital precoding matrix from a terminal, where the first target digital precoding matrix is a reference digital precoding matrix determined by the terminal for precoding;

a second obtaining unit, configured to determine a second target digital precoding matrix based on the information about the first target digital precoding matrix; and a second transmission unit, configured to precode a signal to be processed based on the second target digital precoding matrix, and transmit the signal to be processed that has been precoded and information about the second target digital precoding matrix to the terminal.

Optionally, the device may further include:

a third transmission unit, configured to transmit information about a third target digital precoding matrix to a terminal;

a second reception end unit, configured to receive a signal to be processed that has been precoded from the terminal, where the signal to be processed is obtained by precoding based on the third target digital precoding matrix; and a demodulation unit, configured to demodulate the signal to be processed that has been precoded.

It should be noted that the device according to the embodiments of the present disclosure can implement all the method steps implemented by the network device in the above method embodiments, and the same technical effects can be realized. The same parts of the present embodiments as the method embodiments, and the beneficial effects, are not further provided herein.

Figure 6:
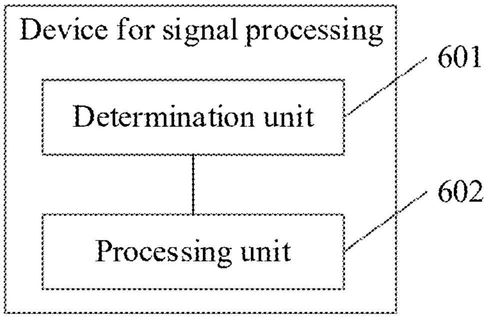
FIG. 6 is a second structural diagram of a device for signal processing according to embodiments of the present disclosure.

As shown in FIG. 6, a device for signal processing of the embodiments of the present disclosure is applied to a terminal, including:

a determination unit 601, configured to determine information about a target digital precoding matrix; and a processing unit 602, configured to perform processing based on the information about the target digital precoding matrix;

the target digital precoding matrix is selected from a target transmission codebook;

the target transmission codebook is formed by a network device, based on each first sub-band-related parameter, and a first digital precoding matrix corresponding to a first analog beamforming matrix or a second analog beamforming matrix for each sub-band under each first sub-band-related parameter;

the first sub-band-related parameter for each sub-band includes one or more of: a center frequency of a broadband signal, a preset central direction angle, the quantity of sub-bands, or a bandwidth of each sub-band.

Optionally, the target digital precoding matrix includes a first target digital precoding matrix and a second target digital precoding matrix; the determination unit 601 is configured to: determine the first target digital precoding matrix, and transmit information about the first target digital precoding matrix to the network device, where the first target digital precoding matrix is a reference digital precoding matrix determined by the terminal for precoding; and receive information about the second target digital precoding matrix; the processing unit 602 is configured to receive a signal to be processed that has been precoded from the network device, and demodulate, based on a reception precoding matrix corresponding to the second target digital precoding matrix, the signal to be processed that has been precoded.

Optionally, the target digital precoding matrix includes a third target digital precoding matrix; the determination unit 601 is configured to receive information about the third target digital precoding matrix from the network device; the processing unit 602 is configured to precode, based on the third target digital precoding matrix, a signal to be processed, and transmit the signal to be processed that has been precoded to the network device.

It should be noted that the device according to the embodiments of the present disclosure can implement all the method steps implemented by the terminal in the above method embodiments, and the same technical effects can be realized. The same parts of the present embodiments as the method embodiments, and the beneficial effects, are not further provided herein.

It should be noted that the division of units in the embodiments of the present disclosure is schematic and only serves as a division of logical functions, and there may be other division methods in actual implementations. In addition, in the embodiments of the present disclosure, various functional units may be integrated into a single processing unit, or the various units may be physically separated, or two or more units may be integrated into one unit. The integrated unit in the above may be implemented in the form of hardware or may be implemented in the form of software functional units.

If the integrated unit is implemented in the form of software functional units and sold or used as an independent product, it may be stored in a processor readable storage medium. Based on this understanding, essence of the technical solutions of the present disclosure, or the part contributing to the conventional technologies, or part or all of the technical solutions, may be embodied in the form of a software product. The computer software product is stored in a storage medium, and includes a number of instructions to enable a computer device (which may be a personal computer, a server, or a network device, etc.) or a processor (processor) to perform all or part of the steps of method described in the various embodiments of the present disclosure. The storage medium includes a USB flash disk, a mobile hard disk, a read-only memory (Read-Only Memory, ROM), a random access memory (Random Access Memory, RAM), a magnetic disk, an optical disk, or other medium which can store program code.

Embodiments of the present disclosure also provide a processor readable storage medium, where the readable storage medium stores a program, and the program, when being execute by a processor, performs various processes in the embodiments of the method for codebook determination or the method for signal processing described above, and same technical effects can be achieved, the repetition of which is not further provided herein. The readable storage medium may be any available medium or data storage device that the processor may access, including but not limited to a magnetic memory (such as a floppy disk, a hard disk, a magnetic tape, a magneto-optical (MO), etc.), an optical memory (such as a compact disk (CD), a digital video disc (DVD), a Blu-ray disc (BD), a high-definition versatile disc (HVD), etc.), or a semiconductor memory (such as an ROM, an Electrical Programmable Read-Only Memory (EPROM), an Electrically Erasable Programmable Read-Only Memory (EEPROM), a non-volatile memory (NAND FLASH), a solid state hard disk (SSD)), etc.

It should be noted that the terms such as "having" and "including" or any other variants thereof, are intended to cover a non-exclusive inclusion, such that a process, method, article, or apparatus that includes a list of elements not only include those elements but may also include other elements that are not expressly listed or that are inherent to such process, method, article, or apparatus. Without more constraints, an element defined by the phrase "including a . . . " does not preclude the existence of additional same elements in the process, method, article, or apparatus that includes the element.

From the above description of the embodiments, it will be clear to a person skilled in the art that the method of the above embodiments may be implemented by means of software plus common hardware platform as needed, or by means of hardware. With such an understanding, the essence the technical solutions of the present disclosure or the part contributing to the conventional technologies may be embodied in the form of a software product, and the computer software product is stored in a storage medium (e.g. ROM/RAM, magnetic disk, optical disk) including instructions to enable a user equipment (which may be a cell phone, a computer, a server, an air conditioner or a network device) to perform the methods described in the various embodiments of the present disclosure.

The embodiments of the present disclosure are described in the above with reference to the drawings, and the present disclosure is not limited to the above specific implementations. The above specific implementations are illustrative rather than restrictive. Various forms can be made by those of ordinary skill in the art under the inspiration of the present disclosure, without departing from the purpose of the present disclosure and the protection scope of the claims, all of which fall within the protection of the present disclosure.

What is claimed is:

1. A method for codebook determination, applied to a network device, comprising:

dividing a broadband signal into a plurality of sub-bands;

determining a first analog beamforming matrix corresponding to each sub-band;

determining a first digital precoding matrix corresponding to each first analog beamforming matrix; and forming a transmission codebook based on each first digital precoding matrix and a first sub-band-related parameter for each sub-band;

wherein a bandwidth of each sub-band meets following requirement: a difference between a first direction angle and a second direction angle is less than a preset threshold;

wherein the first direction angle is a direction angle at which a maximum antenna gain is obtained at frequency $f_c+W/2$ or $f_c-W/2$, and the second direction angle is a preset central direction angle;

wherein $f_c$ represents a center frequency of the broadband signal, and W represents the bandwidth of each sub-band.

2. The method according to claim 1, wherein the determining the first analog beamforming matrix corresponding to each sub-band comprises:

determining the first analog beamforming matrix corresponding to each sub-band for a center frequency of the each sub-band, to cause an antenna array gain at the preset central direction angle to be maximized at the center frequency of the each sub-band, or to cause an antenna array gain outside a preset beam width to be minimized for the each sub-band.

3. The method according to claim 1, further comprising: performing joint optimization for the each first analog beamforming matrix to obtain a second analog beamforming matrix corresponding to the each first analog beamforming matrix.

4. The method according to claim 1, wherein the method further comprises: determining the first digital precoding matrix corresponding to the each first analog beamforming matrix or each second analog beamforming matrix;

determining a first unitary matrix, wherein the first unitary matrix makes a product of a third analog beamforming matrix and the first unitary matrix closest to the first analog beamforming matrix or the second analog beamforming matrix under a condition that a transmission power is unchanged; and determining a product of the first unitary matrix and a second digital precoding matrix as the first digital precoding matrix;

wherein the third analog beamforming matrix is a benchmark analog beamforming matrix corresponding to the broadband signal, and the second digital precoding matrix is a benchmark digital precoding matrix corresponding to each sub-band.

5. The method according to claim 1, wherein the first sub-band-related parameter for each sub-band comprises one or more of: the center frequency of the broadband signal, the preset central direction angle, a quantity of sub-bands, or the bandwidth of the each sub-band; wherein the forming the transmission codebook based on each first digital precoding matrix and the first sub-band-related parameter for the each sub-band comprises: forming the transmission codebook, based on each first sub-band-related parameter, and the first digital precoding matrix corresponding to the first analog beamforming matrix or a second analog beamforming matrix under the each first sub-band-related parameter.

6. The method according to claim 1, further comprising:

determining a reception codebook based on the transmission codebook.

7. The method according to claim 6, wherein the first sub-band-related parameter for each sub-band comprises one or more of: the center frequency of the broadband signal, the preset central direction angle, a quantity of sub-bands, or the bandwidth of the each sub-band; wherein the determining the reception codebook based on the transmission codebook comprises: forming the reception codebook, based on each first sub-band-related parameter, and a first reception precoding matrix corresponding to the first analog beamforming matrix or a second analog beamforming matrix under the each first sub-band-related parameter.

8. The method according to claim 7, wherein one or more of the first digital precoding matrices corresponding to one or more of the first analog beamforming matrices and/or the second analog beamforming matrices correspond to one of the first reception precoding matrices.

9. The method according to claim 1, further comprising: transmitting a first parameter and/or a second parameter to a terminal, wherein the first parameter indicates a codebook type of the transmission codebook, and the second parameter indicates a codebook type of a reception codebook.

10. The method according to claim 1, further comprising:

receiving information about a first target digital precoding matrix from a terminal, where the first target digital precoding matrix is a reference digital precoding matrix determined by the terminal for precoding;

determining a second target digital precoding matrix based on the information about the first target digital precoding matrix; and precoding a signal to be processed based on the second target digital precoding matrix, and transmitting the signal to be processed that has been precoded and information about the second target digital precoding matrix to the terminal.

11. The method according to claim 1, further comprising:

transmitting information about a third target digital precoding matrix to a terminal;

receiving a signal to be processed that has been precoded from the terminal, wherein the signal to be processed is obtained by precoding based on the third target digital precoding matrix; and demodulating the signal to be processed that has been precoded.

12. A device for codebook determination, comprising: a memory, a transceiver, and a processor;

wherein the memory is configured to store a computer program, the transceiver is configured to transmit and receive data under control of the processor, and the processor is configured to read the computer program in the memory to perform following operations:

dividing a broadband signal into a plurality of sub-bands;

determining a first analog beamforming matrix corresponding to each sub-band;

determining a first digital precoding matrix corresponding to each first analog beamforming matrix; and forming a transmission codebook based on each first digital precoding matrix and a first sub-band-related parameter for each sub-band;

wherein a bandwidth of each sub-band meets following requirement: a difference between a first direction angle and a second direction angle is less than a preset threshold;

wherein the first direction angle is a direction angle at which a maximum antenna gain is obtained at frequency $f_c+W/2$ or $f_c-W/2$, and the second direction angle is a preset central direction angle;

wherein $f_c$ represents a center frequency of the broadband signal, and W represents the bandwidth of each sub-band.

13. A method for signal processing, applied to a terminal, comprising:

determining information about a target digital precoding matrix; and performing processing based on the information about the target digital precoding matrix;

wherein the target digital precoding matrix is selected from a target transmission codebook;

wherein the target transmission codebook is formed by a network device, based on each first sub-band-related parameter, and a first digital precoding matrix corresponding to a first analog beamforming matrix or a second analog beamforming matrix for each sub-band under each first sub-band-related parameter;

wherein the first sub-band-related parameter for each sub-band comprises one or more of: a center frequency of a broadband signal, a preset central direction angle, a quantity of sub-bands, or a bandwidth of the each sub-band.

14. The method according to claim 13, wherein the target digital precoding matrix comprises a first target digital precoding matrix and a second target digital precoding matrix;

wherein the determining the information about the target digital precoding matrix comprises: determining the first target digital precoding matrix, and transmitting information about the first target digital precoding matrix to the network device, wherein the first target digital precoding matrix is a reference digital precoding matrix determined by the terminal for precoding; and receiving information about the second target digital precoding matrix;

wherein the performing processing based on the information about the target digital precoding matrix comprises: receiving a signal to be processed that has been precoded from the network device, and demodulating, based on a reception precoding matrix corresponding to the second target digital precoding matrix, the signal to be processed that has been precoded.

15. The method according to claim 13, wherein the target digital precoding matrix comprises a third target digital precoding matrix;

wherein the determining the information about the target digital precoding matrix comprises: receiving information about the third target digital precoding matrix from the network device;

wherein the processing based on the information about the target digital precoding matrix comprises: precoding, based on the third target digital precoding matrix, a signal to be processed, and transmitting the signal to be processed that has been precoded to the network device.

16. The method according to claim 13, further comprising: receiving a first parameter and/or a second parameter, wherein the first parameter indicates a codebook type of a transmission codebook, and the second parameter indicates a codebook type of a reception codebook.

17. A device for signal processing, comprising: a memory, a transceiver, and a processor;

wherein the memory is configured to store a computer program, the transceiver is configured to transmit and receive data under control of the processor, and the processor is configured to read the computer program in the memory to perform the method for signal processing according to claim 13.

* * * * *